(12) United States Patent
Blissenbach et al.

(10) Patent No.: US 7,902,711 B2
(45) Date of Patent: Mar. 8, 2011

(54) METHODS AND APPARATUS FOR A PERMANENT MAGNET MACHINE WITH SEGMENTED FERRITE MAGNETS

(75) Inventors: Rolf Blissenbach, Rolling Hills Estates, CA (US); Khiet Le, Mission Viejo, CA (US); Dang Dinh Dang, Garden Grove, CA (US); Jonathan Bird, Lomita, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 108 days.

(21) Appl. No.: 12/330,958

(22) Filed: Dec. 9, 2008

(65) Prior Publication Data

US 2010/0141076 A1 Jun. 10, 2010

(51) Int. Cl.
*H02K 1/27* (2006.01)
(52) U.S. Cl. .............................. 310/156.53; 310/156.56
(58) Field of Classification Search . 310/156.38–156.57
See application file for complete search history.

(56) References Cited

U.S. PATENT DOCUMENTS

| | | | | |
|---|---|---|---|---|
| 4,924,130 A * | 5/1990 | Fratta | | 310/156.53 |
| 5,929,547 A * | 7/1999 | Kim | | 310/156.53 |
| 5,945,760 A * | 8/1999 | Honda et al. | | 310/156.53 |
| 6,815,859 B2 * | 11/2004 | Sakuma et al. | | 310/156.53 |
| 7,051,421 B2 | 5/2006 | Biais et al. | | |
| 7,436,095 B2 * | 10/2008 | Aydin et al. | | 310/156.53 |
| 7,436,096 B2 * | 10/2008 | Guven et al. | | 310/156.53 |
| 2006/0119203 A1 | 6/2006 | Brown et al. | | |
| 2006/0170301 A1 * | 8/2006 | Masuzawa et al. | | 310/156.53 |
| 2007/0228862 A1 | 10/2007 | Welchko et al. | | |

FOREIGN PATENT DOCUMENTS

JP 2000166142 A * 6/2000
JP 2008283746 A * 11/2008

* cited by examiner

*Primary Examiner* — Tran N Nguyen
(74) *Attorney, Agent, or Firm* — Ingrassia Fisher & Lorenz, P.C.

(57) ABSTRACT

An internal permanent magnet machine ("IPM machine") of the type used, for example, with traction motors and hybrid electric vehicles, includes a rotor having a plurality of equal-sized (e.g., rectilinear) segmented ferrite magnets arranged in one or more layers. The magnets are inserted within rotor slots that are larger than the magnets themselves, such that one or more air gaps are formed adjacent to the magnets in each layer.

11 Claims, 2 Drawing Sheets

METHODS AND APPARATUS FOR A PERMANENT MAGNET MACHINE WITH SEGMENTED FERRITE MAGNETS

TECHNICAL FIELD

The present invention generally relates to magnetic devices such as electrical motors, and more particularly relates to rotors used in connection with interior permanent magnet machines.

BACKGROUND

Interior permanent magnet (IPM) machines are favored for fuel cell and hybrid electric vehicle operations due to their desirable characteristics—good torque density, high overall efficiency, and relatively constant power range, etc. The rotor field in a permanent magnet machine is obtained by virtue of its structure, unlike other machines such as induction, switched or synchronous reluctance machines, in which the field is generated by a stator current supplied by a source. As a result, permanent magnet machines exhibit superior efficiency as compared to other such machines.

In an IPM machine, one or more rotor barriers—including permanent magnets and/or air gaps—are often added. These rotor layers act as barriers to the permanent magnet field of the lower primary magnet layer, reducing the air-gap magnet flux, and lowering the machine back EMF and losses induced by the permanent magnet field.

Traditional IPM rotors are unsatisfactory in a number of respects. For example, the cavities or slots provided within the rotor for accepting the inserted magnets often have a complicated shape, and typically require formation of magnets with trapezoidal and/or more complicated geometries. Fabrication of such magnets is time consuming, costly, and requires tight tolerances. Furthermore, the magnet material used for forming such magnets (e.g., NdFeB) is significantly more expensive than standard magnet material (e.g., ferrite materials).

Accordingly, it is desirable to provide improved IPM rotor designs that are manufacturable, inexpensive, and which maintain suitable magnetic characteristics. Other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

In general, the present invention is directed to a permanent magnet machine ("PM machine") including a rotor having a plurality of equal-sized segmented ferrite magnets arranged in one or more layers. The magnets are inserted within rotor slots that are larger than the magnets themselves, such that one or more air gaps are formed adjacent to the magnets in each layer.

In this regard, the following detailed description is merely illustrative in nature and is not intended to limit the invention or the application and uses of the invention. Furthermore, there is no intention to be bound by any expressed or implied theory presented in the preceding technical field, background, brief summary or the following detailed description. The invention may be described herein in terms of functional and/or logical block components and various processing steps. It should be appreciated that such block components may be realized by any number of hardware, software, and/or firmware components configured to perform the specified functions. For the purposes of conciseness, conventional techniques and systems related to electrical motors, magnetism, and the like are not described in detail herein.

Figure 1:
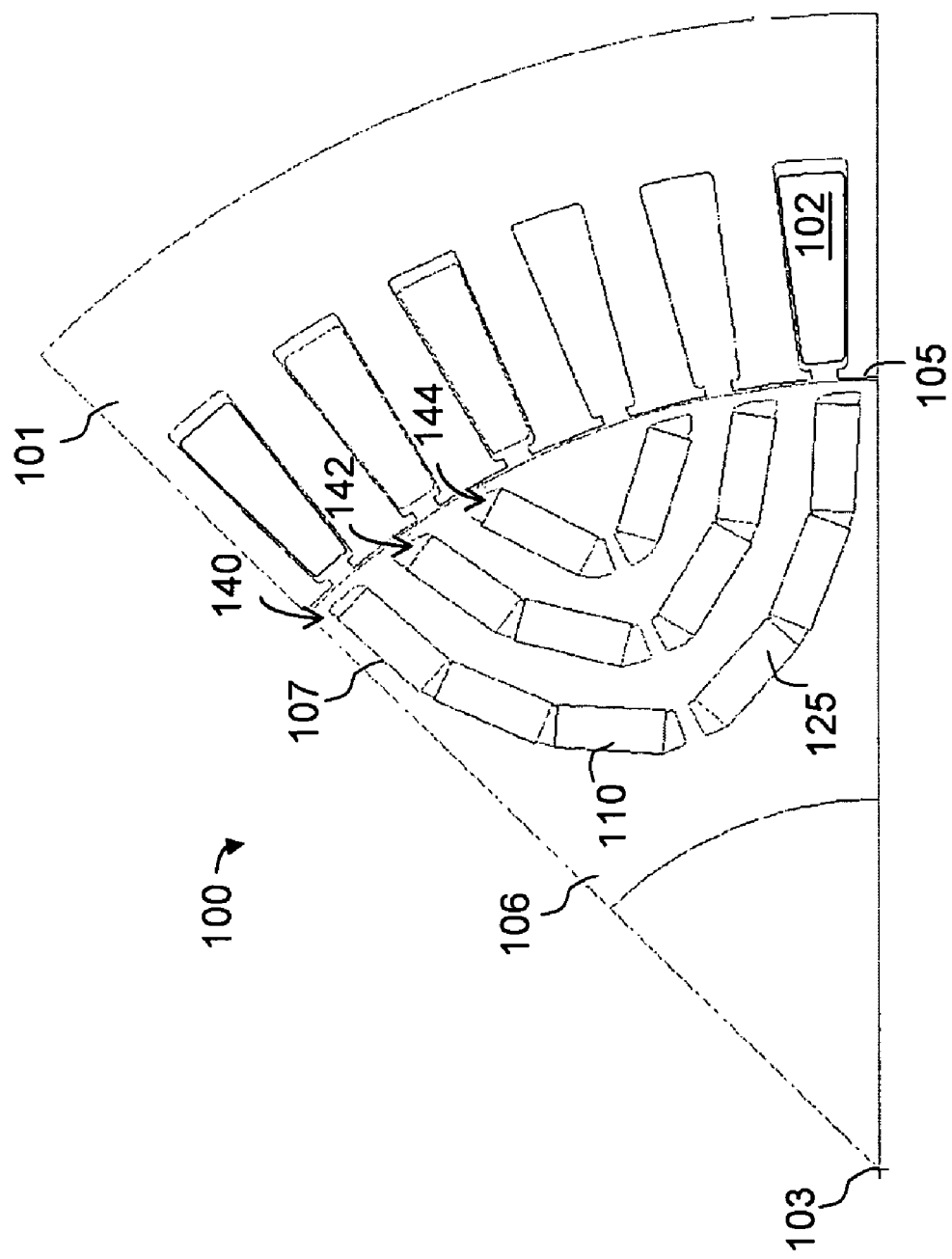
FIG. 1 depicts, in cross-section, a one-eight portion of an IPM machine in accordance with one embodiment.

FIG. 1 illustrates an exemplary partial cross-section of an IPM 100 in accordance with one embodiment. As shown, IPM 100 generally includes a rotor 106 configured to rotate with respect to a stator 101 in the conventional manner about a center of rotation 103. IPM 100 includes a stator 101 having a plurality of windings 102 magnetically interacting with magnets 110 disposed within rotor 106 (i.e., inserted within slots or gaps formed therein).

Rotor 106 initially includes a collection of cutouts, slots, or "cavities," each of which are filled with one or more equal-sized permanent magnets 110 arranged in one or more layers (e.g., 140, 142, and 144). Magnets 110 may comprise any type of permanent magnet material now known or later developed, but in the illustrated embodiment comprises a traditional ferrite magnet material, as is known in the art.

Figure 2:
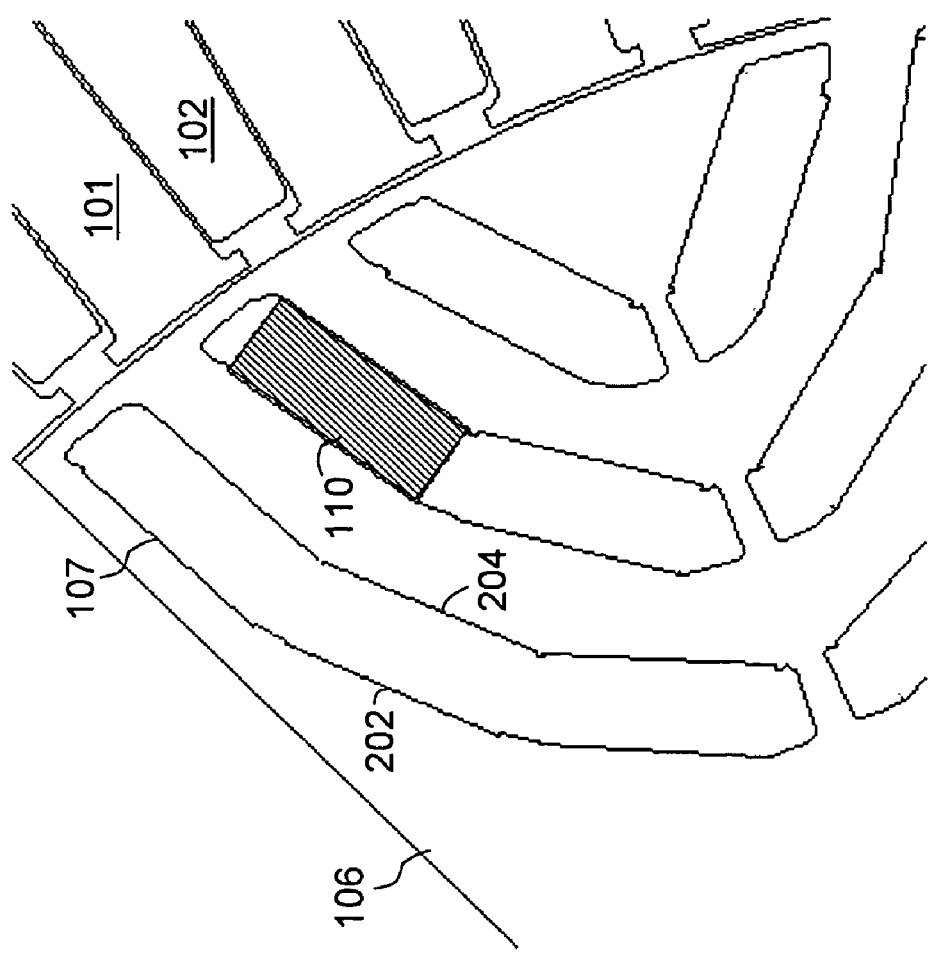
FIG. 2 depicts, in cross-section, a close-up of the IPM of FIG. 1.

That is, referring to FIG. 2, rotor 106 is first provided with a number of cavities 107 configured to accept one or more magnets 110. In the illustrated embodiment, toward improving ease-of-manufacture, each magnet 110 is substantially rectangular or rectilinear and has the same shape and dimensions, e.g., 15×5×30 mm.

Accordingly, slots 107 in rotor 106 have at least two parallel opposite sides (e.g., 202 and 204) such that a suitably sized magnet 110 may be snugly inserted therein (as shown in FIG. 1). The term "cavity" is thus used to refer to a region thus defined prior to insertion of magnets 110. While the figures illustrate a two-dimensional cross-sectional view of magnets 110, it will be understood that cavities 107 extends into rotor 106 and will define a three-dimensional volume having any suitable shape.

In the illustrated embodiment, magnets 110 are arranged in three layers—140, 142, and 144—although any number of layers may be provided. The layers are preferably configured as generally arcuate curves oriented convexly outward (i.e., away from center of rotation 103).

Each layer comprises two symmetrically disposed cavities 107, and may include any number of magnets 110. In this embodiment, layer 144 includes two magnets, layer 142 includes four magnets, and layer 140 includes six magnets. Each adjacent pair of magnets is separated by an air gap 125 which may be filled with a non-magnetic material, e.g. a plastic material.

The structures described above are advantageous in a number of respects. In particular, relatively expensive magnets (such as NdFeB magnets), may be replaced with cheaper ferrite magnets. The lower energy product of the ferrite magnets are compensated for by higher reluctance torque. Using segmented magnets of the same size rather than an assortment of complexly-shaped magnets greatly reduces manufacturing costs.

Rectangular magnets are significantly easier to manufacture than more complicated shapes, as they are characterized by straight edges, sharp corners, tighter tolerances, and easy-to-measure geometries. Furthermore, such magnets are easier and cheaper to mass produce. Tooling for making the cavities or slots 107 is much simpler.

Furthermore, the use of multiple, segmented magnet structures reduces the mechanical stress in the vicinity of air gaps 125. That is, the dynamic stresses generated during rotation are more evenly distributed along the inner and outer bridges, allowing the rotor to be rotated at a higher speed and/or allowing more magnets to be employed.

While at least one example embodiment has been presented in the foregoing detailed description, it should be appreciated that a vast number of variations exist. For example, additional barrier layers may be incorporated in addition to the single layer illustrated. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention and the legal equivalents thereof.

What is claimed is:

1. An interior permanent magnet machine comprising:
   a wound stator;
   a rotor configured to magnetically interact with the wound stator;
   a plurality of cavities provided within the rotor; and
   a plurality of equal-sized magnets provided within the plurality of cavities such that the total volume of each cavity is only partially filled by the respective magnet and such that air gaps are formed adjacent to each magnet;
   wherein the plurality of cavities include a first layer of cavities and a second layer of cavities, the first layer of cavities including a first pair of cavities, and the second layer of cavities including a second pair of cavities; and
   wherein each of the first pair of cavities is configured to receive one of the equal-sized magnets, and each of the second pair of cavities is configured to receive two of the equal-sized magnets.

2. The interior permanent magnet machine of claim 1, wherein the equal-sized magnets are substantially rectangular.

3. The interior permanent magnet machine of claim 2, wherein each cavity has at least one pair of opposite, parallel walls.

4. The interior permanent magnet machine of claim 1, wherein each layer is generally arcuate.

5. The interior permanent magnet machine of claim 1, wherein the air gaps are filled with a non-magnetic material.

6. The interior permanent magnet machine of claim 1, wherein the plurality of magnets are ferrite magnets.

7. A traction motor configured to be used in connection with a vehicle, the traction motor comprising a rotor, a stator, and a plurality of magnet segments provided within a plurality of cavities formed within the rotor in a plurality of layers, each of the magnet segments having substantially the same geometry;
   wherein the plurality of cavities include a first layer of cavities and a second layer of cavities, the first layer of cavities including a first pair of cavities, and the second layer of cavities including a second pair of cavities; and
   wherein each of the first pair of cavities is configured to receive one of the magnet segments, and each of the second pair of cavities is configured to receive two of the magnet segments.

8. The traction motor of claim 7, wherein the plurality of magnets are ferrite magnets.

9. The traction motor of claim 7, wherein the magnet segments are rectangular.

10. The traction motor of claim 7, wherein each of the plurality of layers includes at least one air gap.

11. The interior permanent magnet machine of claim 1, wherein the first pair of cavities exhibit reflectional symmetry about an axis extending radially from the center of the rotor, and the second pair of cavities exhibit reflectional symmetry about the axis.

* * * * *